United States Patent Office 3,471,441
Patented Oct. 7, 1969

3,471,441
POLYESTERS OF DIACID HALIDE BISPHENOL AND ALIPHATIC MODIFIER
Raymond R. Hindersinn, Lewiston, N.Y., assignor to Hooker Chemical Corporation, Niagara Falls, N.Y., a corporation of New York
No Drawing. Continuation-in-part of application Ser. No. 248,220, Dec. 31, 1962. This application July 1, 1968, Ser. No. 741,344
Int. Cl. C08g 17/14
U.S. Cl. 260—47  14 Claims

ABSTRACT OF THE DISCLOSURE

Polyesters having an intrinsic viscosity of at least 0.4 deciliter/gram when measured in sym.-tetrachloroethane at 30 degrees centigrade and which are useful as molding compositions are prepared by reacting an organic diacid halide with a difunctional aliphatic reactive modifier such as a glycol, followed by dissolving the resulting reaction product in a chlorinated hydrocarbon solvent, and thereafter reacting the product with an aqueous solution of an alkali metal salt of a bisphenol, wherein the proportion of the aliphatic modifier comprises from 5 to 85 mole percent of the total of the modfier and bisphenol.

REFERENCE TO PRIOR APPLICATION

This is a continuation-in-part of application Ser. No. 248,220, filed Dec. 31, 1962, now abandoned.

This invention relates to linear polymers and more particularly to linear polymer molding compounds wherein one of the reactants is a bisphenol derivative. The invention further relates to a method for preparing such compounds.

High molecular weight linear polycarbonate compositions based on bisphenols have been shown to be useful in the preparation of films and fibers. Further, these compounds when molded into useful articles using conventional techniques, offer properties superior to those objects molded from other linear polyester compositions. Useful films and fibers have also been prepared from aromatic dicarboxylic acids and aliphatic glycols. Polyethylene terephthalate is an example of such a useful polymer. When bisphenols are reacted with aromatic dicarboxylic acids, however, to form high molecular weight polyesters, the products often have such high softening temperatures that they cannot be fabricated by conventional techniques and some even decompose at temperatures below the softening or melting point of the polymer. For these compositions to be useful as molding compositions it is necessary to reduce the melt viscosity and melting point to useful molding range without substantially reducing their beneficial physical properties. Indeed, these polymers show melt viscosities far in excess of the range which is suitable for conventional injection molding equipment (greater than 50,000 poises at 300 degrees centigrade). Raising the molding temperature to reduce the melt viscosity is not practical always, because most molding equipment does not generally operate at temperatures above 300 degrees centigrade. Also, temperatures exceeding 300 degrees centigrade may lead to polymer degradation.

There has now been discovered new compositions of bis-phenol polyesters which possess greatly improved melt viscosities while still retaining many of the desirable characteristics needed for preparing useful articles.

Accordingly, it is an object of this invention to provide new high molecular weight linear bisphenol polyester polymers. It is another object of this invention to provide methods for preparing the new linear polyester polymers. Other objects will also become apparent to those skilled in the art upon reference to the following detailed description and the examples.

In accordance with this invention, there is provided a method of making a linear polymer and molding compound therefor, in which an aliphatic modifier is incorporated into the structure of the reaction product of a bisphenol and a diacid halide. Further, there is provided a method for homogenous reaction of the aliphatic modifier and di-acid halide followed by an interfacial polymerization of the resultant prepolymer and the bisphenol. The resulting novel polymers have improved melt viscosities for molding applications compared to unmodified polyester polymers.

The high molecular weight linear polymers of the present invention have an intrinsic viscosity of at least 0.4 deciliter/gram (dl./g.) and in most cases above 0.6 dl./g. when measured in a solution of symmetrical tetrachloroethane at 30 degrees centigrade. The polymer contains esterified residues of aliphatic modifiers and bisphenols whose total mole percent may be approximately equal to that of the mole percent of the diacid halide residue contained in the polymer.

The bisphenols which are considered for the preparation of high molecular weight polyesters according to the present invention correspond to the following general formula:

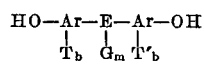

wherein Ar is aromatic (including phenyl, biphenyl and naphthyl); G is selected from the group consisting of alkyl, aryl, haloaryl, haloalkylaryl, alkylaryl, cycloalkyl, cyclohaloalkyl, haloalkyl; E is a bivalent (or disubstituted) radical selected from the group consisting of alkylene, haloalkylene, cycloalkylene, halocycloalkylene, alkylarylene, and haloalkylarylene; T and T' are independently selected from the group consisting of halogen, G' or OG' wherein G' is of the group as set forth for G; $m$ is an integer from zero to the number of replaceable hydrogen atoms on E; and $b$ is an integer from zero to the number of replaceable hydrogen atoms on Ar. When there is a plurality of T and T' substituents in the bisphenols according to the above formula, these substituents may be the same or different. This also applies to the substituents G and G'. The T and T' substituents may occur in the ortho-, meta-, or paraposition with respect to the hydroxyl radical. Additionally, mixtures of the above described bisphenols may be employed to achieve a polymer with especially desired properties.

Bisphenols having the general formula and which are suitable for being applied according to the present invention include, but are not limited to the following:

Bis(4-hydroxyphenyl)methane
Bis(3-methyl-4-hydroxyphenyl)methane
Bis(4-hydroxy-3,5-dichlorophenyl)methane
Bis(4-hydroxy-3,5-dibromophenyl)methane
Bis(4-hydroxy-3,5-difluorophenyl)methane
Bis(4-hydroxyphenyl)-2,2-propane(common name,bisphenol A)
Bis(3-chloro-4-hydroxyphenyl)-2,2-propane
Bis(4-hydroxy-3,5-dichlorophenyl)-2,2-propane
Bis(4-hydroxynaphthyl)-2,2-propane
Bis(4-hydroxyphenyl)phenylmethane
Bis(4-hydroxyphenyl)diphenylmethane
Bis(4-hydroxyphenyl)-4'-methylphenylmethane
Bis(4-hydroxyphenyl)-4'-chlorophenylmethane
Bis(4-hydroxyphenyl)-2,2,2-trichloro-1,1,2-ethane
Bis(4-hydroxyphenyl)-1,1-cyclohexane
Bis(4-hydroxyphenyl)cyclohexylmethane
4,4-dihydroxydiphenyl
2,2'-dihydroxydiphenyl Dihydroxynaphthalenes
Bis(4-hydroxyphenyl)-2,2-butane
Bis(2,6-dichloro-4-hydroxyphenyl)-2,2-propane
Bis(2-methyl-4-hydroxyphenyl)-2,2-propane
Bis(3-methyl-4-hydroxyphenyl)-1,1-cyclohexane
Bis(2-hydroxy-4-methylphenyl)-1,1-butane
Bis(2-hydroxy-4-tertbutylphenyl)-2,2-propane
Bis(4-hydroxyphenyl)-1-phenyl-1,1-ethane
4,4'-dihydroxy-3-methyl diphenyl-2,2-propane
4,4'-dihydroxy-3-methyl-3'-isopropyldiphenyl-2,2-butane In the polycondensation reaction according to the invention, alkali bisphenates are used which are obtained by dissolving the above bisphenols in water in the presence of equivalent amounts of alakli hydroxides such as sodium, rubidium, cesium and potassium hydroxides, preferably sodium and potassium.

As dicarboxylic acid chlorides for the reaction there may be those acid chlorides of the formula:

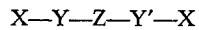

wherein Z is a bivalent or disubstituted radical selected from the group consisting of alkylene, arylene, cycloalkylene, alkylarylene, Y and Y' are independently selected from the group consisting of CO, S, SO, $SO_2$; and X is halogen. Additionally, mixtures of the above described dicarboxylic acid chlorides may be employed to achieve a polymer with especially desired properties.

Among aromatic disulfonyl halides which can be used in the polycondensation reaction according to the invention are:

1,4-benzenedisulfonyl chloride;
1,3-benzenedisulfonyl chloride;
1,2-benzenedisulfonyl chloride;
2,4-toluenedisulfonyl chloride;
2,7-naphthalenedisulfonyl chloride;
4,4'-diphenyldisulfonyl chloride;
4,4'-diphenyloxidedisulfonyl chloride;
4,4'-diphenylmethanedisulfonyl chloride;
4,4'-diphenylsulfonedisulfonyl chloride;
3,3'-diphenylsulfonedisulfonyl chloride;
Bis(4-chlorosulfonylphenyl)-2,2'-propane;
4,5-dichloro-1,3-benzenedisulfonyl cholride;
4,6-dichloro-1,3-benzenedisulfonyl chloride; and
4,5,6-trichloro-1,3-benzenedisulfonyl chloride.

Among the diacid halides of dicarboxylic acids which can be used according to the invention are:

Terephthaloyl chloride;
Isophthaloyl chloride;
Sebacoyl chloride;
Adipolychloride;
4,4'-diphenylether dicarboxylic acid chloride;
(4,4'-dihydroxydiphenyl-2,2'-propane)bischloroformate
ethylene glycol bischloroformate; and
Fumaryl chloride.

Diacid halides of aromatic monocarboxysulfonic acids include:

m-Chlorosulfonylbenzoyl chloride;
p-Chlorosulfonylbenzoyl chloride;
2-sulfonyl chloride-1-naphthoic acid.

The third constituent of the polymers of this invention is a reactive difunctional aliphatic modifier. For the purpose of this specification and claims, aliphatic is used in the broad sense, as being opposed to aromatic. The difunctional aliphatic modifiers suitable for use in this invention may be represented by the formula

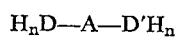

wherein D and D' are independently selected from the group consisting of O, S, and N; A is a bivalent or disubstituted aliphatic radical, free of tertiary carbon atoms, selected from the group consisting of alkylene, cycloalkylene, arylalkylene, alkyleneoxyalkyl, poly(alkyleneoxy)alkyl, alkyenecarboxyalkylenecarboxyalkyl and poly(alkylenecarboxyalkylenecarboxy)alkyl; and $n$ is an integer from 1 to 2 with $n$ being 2 when D or D' is N. Among the compounds suitable for this purpose as modifiers in the present reaction and product are:

Ethylene glycol
Diethylene glycol
Neopentyl glycol
1,4-cyclohexane dimethanol
1,4-butane dithiol
Dipropylene glycol
Polypropylene glycol
1,1-isopropylidenebis(p-phenyleneoxy)di-2-ethanol
2,2,4,4-tetramethyl-1,3-cyclobutanediol
Bis(4-hydroxycyclohexane)-2,2-propane
Di(hydroxyethyl)adipate
Di(hydroxypropyl)glutarate
Di(hydroxyethyl)poly(ethylene glycol)adipate
Ethane dithiol
Ethanolamine
Methylethanolamine
Hexamethylenediamine
1,3-propanediol
2-mercaptoethanol
2-aminopropanethiol The amount of difunctional aliphatic modifier to be used in preparing the polyester of this invention is dependent upon the polymer properties desired. Although the change in properties effected by the incorporation of the difunctional aliphatic modifier into the homopolymer is dependent upon the structure of the modifier employed increasing amounts of difunctional aliphatic modifier generally result in a decrease in the melt viscosity and glass transition point of the polymer. These properties can be varied within a wide range, dependent upon the kind and quantity of the difunctional aliphatic modifier incorporated into the polymer chain. Of course, combinations of aliphatic modifiers can be used too, usually to obtain special properties. Although the amount of difunctional aliphatic modifier used to modify the polymer may be as much as 85 mole percent of the reactive groups reacted with the diacid halide to prepare the polymer, generally very substantial modification of the original polymer can be effected by incorporaiton of 30–60 mole percent of difunctional aliphatic modifier. Although the field of polymer chemistry is highly developed and continually rapidly expanding, the present processes and products are novel and represent advances over previously known art.

The art teaches that high molecular weight polyesters can be prepared by reaction of an ester of an aromatic dicarboxylic acid with a glycol or bisphenol at elevated temperatures in the presence of a suitable catalyst. It is also known that bisphenol polyesters can be prepared by the reaction at ambient temperatures of an aromatic diacid chloride dissolved in a water immiscible organic solvent, with an aqueous alkaline solution of the bisphenol, with catalytic amounts of a quaternary ammonium salt present. Generally this latter method cannot be used to copolymerize an aliphatic glycol into the polyacrylate because of inability of the glycol to react under the polymerization conditions. It is also known that polyesters of aromatic dicarboxylic acids and aliphatic glycols can be prepared by the reaction at elevated temperatures of the diacid chloride and glycol. However, none of these methods results in the present products.

The copolymers of the present invention can be prepared most simply by a novel two-stage reaction process.

In the preferred process the diacid halide and difunctional aliphatic modifier are reacted together at temperatures from about 20 to about 130 degrees centigrade. The reaction is completed when hydrogen chloride evolution is substantially completed. Thereafter a chlorinated hydrocarbon solvent, catalysts and water solution of an alkali metal salt of the bisphenol are charged to the reaction vessel with rapid stirring. When the polymerization is completed, the polymer solution is neutralized, the polymer is washed and is then separated out.

The polycondensation reaction may be carried out at temperatures between about minus 10 degrees centigrade and the boiling point of the organic solvent used. If a diacid halide is employed which is sensitive to hydrolysis, low polymerization temperatures and inorganic salts can be used to hold hydrolysis to a minimum.

It is an important advantage of the present invention that the reaction can be carried out at atmospheric pressure. However, less than atmospheric or greater than atmospheric pressure may be used. The nonmiscible solvents separately keep the chemical components and products in solution. The bisphenol and inorganic salts are dissolved in the aqueous phase and the difunctional aliphatic modifier diacid halide prepolymer together with the polyester product, are in the nonaqueous phase. Additionally, the process proceeds to completion at a faster rate than other processes by which the polymers of this invention might have been made.

Chlorinated hydrocarbon solvents have been found to be useful solvents for this reaction. The choice of solvent is determined by the solubility of the polymer in the solvent, the boiling point of the solvent and the stability of the solvent under basic conditions. The most useful solvents for this process are methylene chloride, and chloroform. Among other useful solvents are carbon tetrachloride, trichloroethylene, tetrachloroethylene, and monochlorobenzene. Aromatic compounds such as benzene, toluene and xylene may also be used. Water is employed as the solvent for the alkali metal bisphenates.

According to the process of the invention, especially high molecular weight product is obtained if the reaction is carried out in the presence of a suitable catalyst such as a quaternary ammonium compound, tertiary sulfonium compound, quaternary arsonium compound or quaternary phosphonium compound. Suitable quaternary ammonium compounds, being soluble both in water and in the organic solvent used for the diacid halide, are those such as trimethylbenzylammonium chloride, triethylbenzylammonium chloride and dimethylethylbenzylammonium hydroxide. Suitable quaternary arsonium compounds are those such as trimethyl octyl arsonium iodide, methyl triphenyl arsonium iodide, triphenyl-p-nitrobenzyl arsonium bromide and triphenyl benzyl arsonium chloride. Among the suitable quaternary phosphonium compounds are triphenyl methyl phosphonium iodide, triphenyl benzyl phosphonium chloride and ethylcyclopentamethylenephenyl phosphonium acetate. Useful tertiary sulphonium compounds are those such as 2-hydroxyphenyldimethyl sulphonium chloride, 3,5-dihydroxyphenyldimethyl sulphonium chloride, S,S' - p - xylene-bis(dihydroxyethylsulphonium bromide) and hexamethylene - S,S' - bis(dimethyl)-1,6-disulphonium bromide. These catalysts are preferably added in amounts between 0.01 and 5 percent calculated on the weight of the metal diphenates used.

The color and clarity of the compositions of this invention are improved by excluding oxygen from the reaction vessel. Phenols and bisphenols upon slight oxidation discolor to a deep red. Since pronounced colors are hard to mask, the polymer to be most useful should be colorless or nearly colorless. Therefore, an inert gas is employed to exclude oxygen from the reaction vessel. While it has been convenient to use nitrogen, any suitable inert gas or mixture may be used.

Optionally small amounts of adjuvants or modifiers may be admixed with the polymers of this invention so that more useful articles may be obtained. Thus, dyes and pigments for different colors, waxes and stearates for mold flow and mold release, and inert fillers may be added to modify physical properties.

The melt viscosity of the polymers of the invention does not generally exceed 1,000,000 poises, and preferably does not exceed about 100,000 poises as measured by American Society for Testing Materials (ASTM) Procedure D1238–57T. More preferably, the melt viscosity is less than 50,000 poises.

Because the polymers of the invention are thermoplastic, they can be worked up into useful articles by applying fabrication techniques known in the art such as compression or injection molding, vacuum forming, extrusion, solvent coating and fiber spinning. The actual times, pressures and temperatures of fabrication are dependent upon the method of making, and the size and shape of the article.

The practice of this invention is illustrated but not limited by the examples given below.

Example 1.—Preparation of bisphenol A-ethylene glycol polyisophthalate

A creased flask equipped with a condenser, stirrer, thermometer and nitrogen gas inlet and outlet was charged with 45.7 parts (0.225 M) of isophthaloyl chloride, 2.79 parts (0.045 M) of ethylene glycol (water content 0.035% by weight) and 149 parts of water washer and distilled chloroform. Under a slow flow of dry nitrogen gas and with stirring, the reaction mixture was heated to reflux for thirty hours until the evolution of hydrogen chloride ceased. The flask was then charged with 668 parts of distilled methylene chloride and 2.1 parts of an aqueous benzyltrimethylammonium chloride solution containing sixty percent of the quaternary salt by weight. A compensating addition funnel was placed on the reaction flask. The funnel was charged with a disodium bisphenol-A solution made up of 41.1 parts (0.18 M) of bisphenol-A, 18.0 parts of sodium hydroxide (98% pure) and 400 parts of water. The bisphenol-A solution was added to the flask over a period of ten minutes. The contents of the flask were stirred rapidly and the flow of the nitrogen gas over the flask contents was maintained at all times. The reaction temperature increased to reflux during the addition. The reaction mixture was stirred for thirty minutes under room temperature conditions after the addition of the bisphenol-A solution. Four hundred and thirty eight parts of a concentrated hydrochloric acid-distilled water solution (50:50 by volume) was then added to the flask, the reaction mixture was stirred for a few minutes and the entire contents of the flask were poured into a separatory funnel. The aqueous acid layer was discarded and the organic polymer phase was washed with successive equal volumes of distilled water until the aqueous wash layer gave a negative test to aqueous silver nitrate. The polymer solution was slowly added to a large excess of chemically pure acetone with vigorous stirring. The polymer was precipitated, recovered and dried. The polymer was found to possess an intrinsic viscosity of 0.75 in s-tetrachloroethane at 30 degrees centigrade. The yield of polymer was 34 parts. Average melt viscosity of the polymer was 43,800 poises at 300 degrees centigrade. At an intrinsic viscosity of 0.59 deciliter per gram (dl./g.) bisphenol polyisophthalate has a melt viscosity of 114,000 poises at 300 degrees centigrade.

Example 2.—Preparation of bisphenol A-neopentyl glycol polyterephthalate

A creased flask (equipped with a stirrer, condenser, thermometer and nitrogen gas inlet and outlet) was charged with 203 parts (1.0 M) of terephthaloyl chloride (98% pure) and 20.8 parts (0.2 M) of distilled neopentyl glycol. Under a slow flow of nitrogen gas and with stirring the reaction flask was heated to a temperature of 70 to 74 degrees centigrade in an oil bath for 4.5 hours. The yield of hydrogen chloride gas after heating for 4.5 hours was 91 percent of the theoretical quantity. The flask was then charged with 2672 parts of distilled methylene chloride and 9.28 parts of an aqueous benzyltrimethylammonium chloride solution containing sixty percent of the salt by weight. A dropping funnel containing a disodium bisphenol-A solution of 81.6 parts of sodium hydroxide, 182.6 parts (0.8 M) of bisphenol-A and 1800 parts of distilled water was placed on the reaction flask. The bisphenol-A solution was added to the flask over a period of thirty minutes; with rapid stirring. The flow of dry nitrogen gas over the flask contents was maintained at all times. The reaction temperature increased to reflux during the addition. The reaction mixture was then stirred for an additional 15 minutes at room temperature. The entire contents of the flask was then poured into a five-gallon pan, two liters of methylene chloride were added together with 2190 parts of a concentrated hydrochloric acid-distilled water solution (50:50 by volume) and the pan contents were stirred for 5 minutes. After the stirring was stopped, a two phase solution resulted; the aqueous top layer was discarded and the methylene chloride polymer solution was washed (by stirring) with successive one-gallon batches of distilled water until the aqueous wash layer gave a negative test to aqueous silver nitrate. The methylene chloride polymer solution was poured into an addition funnel and was slowly added to five gallons of acetone with rapid stirring. After drying, the precipitated polymer floc was found to possess an intrinsic viscosity of 1.89 dl./g. in s-tetrachloroethane at 30 degrees centigrade. The average melt viscosity was 299,300 poises at 325 degrees centigrade.

EXAMPLE 3

The dried polymer powder of Example 2 was pelletized by extruding through a circular die and chopping the resulting rod-like extrudate into short lengths. The pellets were dried under vacuum at 105 degrees centigrade.

The pellets were molded into suitable test specimens using an injection molding machine with pressures of about 10,000 lbs./sq. in. The test discs were 4 inches in diameter, ⅛ inch thick and were molded at 650 degrees Fahrenheit. The test bars were ½ by 5 inches (unless otherwise noted) and were molded at 625 degrees Fahrenheit.

The following physical properties were determined on the molded specimens according to ASTM test methods specified.

ELECTRICAL

Dielectric strength (ASTM D-150):
  Short time, volts/mil ........................................... 430
  Step by step, volts/mil ......................................... 380
  Arc resistance (ASTM D-495), seconds ............................ 80

PHYSICAL

Rockwell hardness .................................................. M-66
Heat distortion (at 66 lbs./sq. in.), ° F .......................... 302
Tensile strength, lbs./sq. in ...................................... 8,200
Flexural strength, lbs./sq. in ..................................... 12,850
Flexural modulus, lbs./sq. in ...................................... 3.09×10⁵
Impact—Notch Izod (ASTM D-256):

| | Intrinsic viscosity | Bar thickness (inch) | | |
|---|---|---|---|---|
| | | ⅛ | ¼ | ½ |
| Notched Izod Impact Strength (ft.-lb./in. notch): | | | | |
| Sample 1 | 0.62 | 7.5 | 3.8 | |
| Sample 2 | 0.67 | 8.9 | 3.8 | 4.1 |
| COMPARATIVE | | | | |
| Bisphenol-A Polycarbonate | 0.61 | 13.6 | 1.6 | 1.6 |

Example 4.—Preparation of bisphenol A-trimethylene glycol polyisophthalate

A creased flask was charged with 20.30 parts (0.1 M) of isophthaloyl chloride and 1.52 parts (0.02 M) of trimethylene glycol (1,3-propanediol). Under a slow flow of dry nitrogen gas and with stirring the reaction flask was heated to a temperature of 68 to 72 degrees centigrade in an oil bath for 22.0 hours. The yield of hydrogen chloride gas after heating for 19.5 hours was 93.9 percent of the theoretical amount. The flask was then charged with 361 parts of distilled methylene chloride and 0.93 part of an aqueous benzyltrimethylammonium chloride solution containing sixty percent of the salt by weight. A dropping funnel containing a disodium bisphenol-A solution, composed of 8.16 parts of sodium hydroxide, 18.26 parts (0.080 M) of bisphenol-A and 250 parts of distilled water, was placed on the reaction flask. The bisphenol-A solution was added to the flask over a period of ten minutes with rapid stirring. The flow of dry nitrogen gas over the flask contents was maintained at all times. The re-

EXAMPLES 5–28

| Ex. | Reactants,* Mole Percent | | | Intrinsic Viscosity | Melt Viscosity at 300° C., Poise×10³ | Tensile Strength, p.s.i. | Flexural Strength, p.s.i. | Flexural Modulus, p.s.i.×10⁵ | Notched Izod Impact Strength, ft.-lbs./inch |
|---|---|---|---|---|---|---|---|---|---|
| | NonAcid | | | | | | | | |
| | Modifier | Bisphenol | Acid | | | | | | |
| 5 | EG, 10 | BPA, 90 | IPC, 100 | .5 | 30.0 | 9,800 | 15,100 | 3.4 | 1.4 |
| 6 | EG, 15 | BPA, 85 | IPC, 100 | .59 | 26.1 | | | | |
| 7 | EG, 40 | BPA, 60 | IPC, 100 | 1.11 | 3.6 | | | | |
| 8 | DEG, 20 | BPA, 80 | IPC, 100 | 1.73 | 188.2 | | | | |
| 9 | DEG, 20 | BPA, 80 | IPC, 100 | .76 | 137.0 | 8,200 | 16,500 | | 1.1 |
| 10 | DEG, 25 | BPA, 75 | IPC, 100 | .67 | 30.0 | | 16,600 | 4.0 | 0.8–2.1 |
| 11 | DEG, 35 | BPA, 65 | IPC, 100 | | 10 | 10,600 | 17,900 | 4.0 | 0.4–6.7 |
| 12 | DEG, 40 | BPA, 60 | IPC, 100 | 1.11 | 3.6 | | | | |
| 13 | DEG, 30 | IPOC, 70 | IPC, 100 | .79 | 11 at 275° C | | | | |
| 14 | CDM, 30 | BPA, 70 | IPC, 100 | .79 | 67.1 at 275° C | | | | |
| 15 | DPG, 30 | BPA, 70 | IPC, 100 | 1.32 | 64.2 at 275° C | | | | |
| 16 | MCE, 20 | BPA, 80 | IPC, 100 | .85 | 128.3 at 275° C | | | | |
| 17 | NPG, 30 | BPA, 70 | IPC, 100 | .7 | 10 | 10,000 | 16,900 | 3.6 | 0.8–3.9 |
| 18 | NPG, 40 | BPA, 60 | IPC, 100 | .85 | 35.7 | | | | |
| 19 | NPG, 40 | BPA, 60 | TPC, 100 | | 30.0 | 8,000 | 12,700 | 2.9 | 6.10 |
| 20 | NPG, 50 | BPA, 50 | TPC, 100 | | 19.7 | 8,200 | 13,300 | 3.2 | 2.9 |
| 21 | DEG, 40 | BPA, 60 | TPC, 100 | | 46 | 8,400 | 13,200 | 3.1 | >20 |
| 22 | NPG, 20; DEG, 20 | BPA, 60 | TPC, 100 | 1.53 | 73.1 | | | | |
| 23 | EOB, 30 | BPA, 70 | TPC, 100 | 1.65 | 27.1 | | | | |
| 24 | DEG, 30 | BPA, 70 | IPC, 90; TPC, 10 | 1.68 | 84.6 | | | | |
| 25 | DEG, 35 | BPA, 65 | IPC, 75; TPC, 25 | | | | 16,300 | 3.5 | .9–2.2 |
| 26 | NPG, 40 | BPA, 60 | IPC, 10; TPC, 90 | .63 | 221.7 at 275° C | | | | |
| 27 | NPG, 40 | BPA, 60 | IPC, 25; TPC, 75 | | | 9,200 | 15,000 | 3.4 | 2–4 |
| 28 | NPG, 20 | BPA, 80 | IPC, 30; TPC, 70 | | | | 14,500 | | 1.5–2.4 |

*Modifier Code:
  EG = Ethylene glycol.
  DEG = Diethylene glycol.
  CDM = 1,4-cyclohexane dimethanol.
  DPG = Dipropylene glycol.
  MCE = 2-mercaptoethanol.
  EOB = tech. grade 1,1′-isopropylidenebis(p-phenyleneoxy)di-2-ethanol (Dow Resin X-2635, Dow Chemical Corp.).

Bisphenol Code:
  BPA = Bisphenol A.
  IPOC = Isopropylidiene di-O-cresol.
Acid Code:
  IPC = Isophthaloyl chloride.
  TPC = Terephthaloyl chloride.

action temperature increased during the addition. The reaction mixture was stirred for twenty-five minutes at room temperature. The flask was then charged with 219 parts of a concentrated hydrochloric acid-distilled water solution (50:50 by volume), the reaction mixture was stirred for a few minutes and the entire contents of the flask were poured into a separatory funnel. The aqueous acid layer was discarded and the organic polymer phase was washed with successive equal volumes of distilled water until the aqueous wash layer gave a negative test to aqueous silver nitrate. The polymer solution was then slowly added to a large excess of pure acetone with vigorous stirring. The precipitated polymer was dried and was found to possess an intrinsic viscosity of 0.86 dl./g. in s-tetrachloroethane at 30 degrees centigrade. The yield of polymer was 24 parts. At an intrinsic viscosity of 0.75 dl./g. the copolymer was found to possess a melt viscosity of 117,700 poises at 300 degrees centigrade. At an intrinsic viscosity of 0.75 dl./g. bisphenol polyisophthalate has a melt viscosity of 390,000 poises.

Examples 5 thru 28, listed in the above table, were prepared in a manner similar to Examples 1, 2, and 4 above. Tests thereon resulted in the properties tabulated.

Examples 29–36

In the following examples, additional polyester products of the invention were produced when the indicated components were reacted in accordance with the procedure of Example 1.

| Ex. | Aliphatic Modifier | Bisphenol | Acid Component |
|---|---|---|---|
| 29 | Di(hydroxyethyl)adipate | 4,4'-dihydroxy diphenyl 2,2'-butane. | Fumaryl chloride. |
| 30 | Diethylene glycol | Orthotetrachloro-4,4'-dihydroxydiphenyl 2,2'-propane. | Phthaloyl chloride. |
| 31 | Di(hydroxyethyl)sebacate | Bisphenol A | Adipoyl chloride. |
| 32 | Neopentyl glycol | do | Phthaloyl chloride. |
| 33 | 2,2′,4,4′-tetramethyl-1,3-cyclobutanediol | do | Isophthaloyl chloride. |
| 34 | 2,2-bis(4-hydroxycyclohexane)propane. | do | Do. |
| 35 | Diethylene glycol | 2,4'-dihydroxydiphenyl methane. | Do. |
| 36 | Polypropylene glycol, 2,000 molecular weight. | Bisphenol A | Do. |

Example 37

A polymer was prepared according to the method of Example 1 by reacting 0.040 mole of m-chlorosulfonyl-benzoyl chloride with 0.004 mol diethylene glycol at 100 degrees centigrade and reacting the resutling reaction product with 0.036 mol of bisphenol A. Approximately 98.4% of theoretical quantity of hydrogen chloride was evolved. The polymer was precipitated with alcohol and dried. The resulting polymer was suitable for forming clear film.

Example 38

A polymer was prepared according to the method of Example 1 by reacting 0.01 mol of isophthaloyl chloride with 0.003 mol of ethanolamine at 120 degrees centigrade. Approximately 63 percent of theoretical quantity of hydrogen chloride was evolved. The resulting reaction product was reacted with 0.007 mol of bisphenol A. The resulting polymer was precipitated with acetone, redissolved and precipitated with n-hexane. The dried polymer contained 1.34 percent nitrogen by the Kjeldhal method and was suitable for preparing clear films.

The preceding examples illustrate the preparation of and toughness of the polymers of this invention. The Izod impact values are substantially above those of the polymers usually utilized in molding useful plastic articles. Thickness variation is less critical in the invented polymers. Therefore, designers and fabricators have greater choices in the configuration of their products.

The tough thermoplastic polymers of the present invention show different melt viscosities, depending on the compositions employed but such viscosities are less than those of the corresponding bisphenol diacid halide polyester. In this respect the former polyesters are superior to the latter, which have found slight application on account of their high melt viscosities. In consequence of the lower melt viscosity of this invention the shaped articles produced therefrom are commercially feasible and have good mechanical properties.

Various changes and modifications may be made in the method of this invention, and in the mole ratios of the polymers of this invention, certain preferred ones of which have been herein described, without departing from the spirit and scope of this invention. These modifications and substitution with equivalent elements are regarded as within the scope of the invention.

I claim:

1. A polymeric polyester, having an intrinsic viscosity of at least 0.40 deciliter/gram when measured is sym.-tetrachloroethane at 30 degrees centigrade, of components consisting essentially of (1) a polyester prepolymer of components consisting essentially of (a) an organic diacid halide of the formula X—Y—Z—Y'—X, wherein Z is a bivalent radical selected from the group consisting of alkylene, arylene, cycloalkylene, alkylarylene; Y and Y' are independently selected from the group consisting of CO, SO, $SO_2$; and X is halogen, and (b) a difunctional aliphatic modifier of the formula $H_nD$—A—$D'H_n$, wherein D and D' are independently selected from the group consisting of S, O and N; A is a bivalent group free of tertiary carbon atoms and selected from the group consisting of alkylene, cycloalkylene, arylalkylene, alkylene-oxyalkyl, poly(alkyleneoxy)alkyl, alkylenecarboxyalkylenecarboxyalkyl and poly(alkylenecarboxyalkylenecarboxy)alkyl; $n$ is an integer from 1 to 2, with $n$ being 2 when D or D' is N, and (2) a bisphenol, the proportion of said modifier comprising from 5 to 85 mole percent of the total of said modifier and said bisphenol.

2. The polymeric polyester of claim 1 wherein the bisphenol has the formula

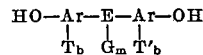

wherein Ar is arylene; G is selected from the group consisting of alkyl, aryl, haloaryl, haloalkyl, haloalkylaryl, alkylaryl, cycloalkyl and halocycloalkyl; E is a bivalent radical selected from the group consisting of alkylene, haloalkylene, cycloalkylene, halocycloalkylene, alkylarylene and haloalkylarylene; T and T' are independently selected from the group consisting of halogen, G' and OG' wherein G' is of the group set forth of G; $m$ is an integer from zero to the number of replaceable hydrogen atoms on E; and $b$ is an integer from zero to the number of replaceable hydrogen atoms on Ar.

3. The polymeric polyester of claim 1 wherein the organic diacid halide is isophthaloyl chloride, the modifier is neopentyl glycol and the bisphenol is bis(4-hydroxyphenyl)-2,2-propane.

4. The polymeric polyester of claim 1 wherein the organic diacid halide is isophthaloyl chloride, the modifier is ethylene glycol and the bisphenol is bis(4-hydroxyphenyl)-2,2-propane.

5. The polymeric polyester of claim 1 wherein the organic diacid halide is terephthaloyl chloride, the modifier is neopentyl glycol and the bisphenol is bis(4-hydroxyphenyl)-2,2-propane.

6. The polymeric polyester of claim 1 wherein the organic diacid halide is isophthaloyl chloride, the modifier is diethylene glycol and the bisphenol is bis(4-hydroxyphenyl)-2,2-propane.

7. The polymeric polyester of claim 1 wherein the organic diacid halide is terephthaloyl chloride, the modifier is diethylene glycol and the bisphenol is bis(4-hydroxyphenyl)-2,2-propane.

8. A process for preparing a polymeric polyester, having an intrinsic viscosity of at least 0.40 deciliter/gram when measured in sym.-tetrachlorethane at 30 degrees centigrade, of components consisting essentially of (1) a polyester prepolymer of components consisting essentially of (a) an organic diacid halide of the formula X—Y—Z—Y'—X, wherein Z is a bivalent radical selected from the group consisting of alkylene, arylene, cycloalkylene, alkylarylene; Y and Y' are independently selected from the group consisting of CO, SO, $SO_2$; and X is halogen, and (b) a difunctional aliphatic modifier of the formula $H_nD$—A—$D'H_n$, wherein D and D' are independently selected from the group consisting of S, O and N; A is a bivalent group free of tertiary carbon atoms and selected from the group consisting of alkylene, cycloalkylene, arylalkylene, alkyleneoxyalkyl, poly(alkyleneoxy)alkyl, alkylenecarboxyalkylenecarboxyalkyl and poly(alkylenecarboxyalklenecarboxy)alkyl; $n$ is an integer from 1 to 2, with $n$ being 2 when D or D' is N, and (2) a bisphenol consisting essentially of:
(A) reacting said organic diacid halide and said difunctional aliphatic reactive modifier,
(B) dissolving the resulting reaction product in a chlorinated hydrocarbon solvent, and
(C) reacting said reaction product with an aqueous solution of an alkali metal salt of said bisphenol as the sole reactant in said aqueous solution in the presence of an alkaline catalyst; the proportion of said modifier comprising from 5 to 85 mole percent of the total of said modifier and said bisphenol.

9. A process according to claim 8 wherein the bisphenol is of the formula

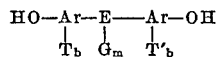

wherein Ar is arylene; G is selected from the group consisting of alkyl, aryl, haloaryl, haloalkyl, haloalkylaryl, alkylaryl, cycloalkyl and halocycloalkyl; E is a bivalent radical selected from the group consisting of alkylene, haloalkylene, cycloalkylene, halocycloalkylene, alkylarylene and haloalkylarylene; T and T' are independently selected from the group consisting of halogen, G' and OG' wherein G' is of the group set forth for G; $m$ is an integer from zero to the number of replaceable hydrogen atoms on E; and $b$ is an integer from zero to the number of replaceable hydrogen atoms on Ar.

10. The process of claim 8 wherein the organic diacid halide is isophthaloyl chloride, the modifier is neopentyl glycol and the bisphenol is bis(4-hydroxyphenyl)-2,2-propane.

11. The process of claim 8 wherein the organic diacid halide is terepthaloyl chloride, the modifier is neopentyl glycol and the bisphenol is bis(4-hydroxyphenyl)-2,2-propane.

12. The process of claim 8 wherein the organic diacid halide is isophthaloyl chloride, the modifier is diethylene glycol and the bisphenol is bis(4-hydroxyphenyl)-2,2-propane.

13. The process of claim 8 wherein the organic diacid halide is terephthaloyl chloride, the modifier is diethylene glycol and the bisphenol is bis(4-hydroxyphenyl)-2,2-propane.

14. The process of claim 8 wherein the organic diacid halide is isophthaloyl chloride, the modifier is ethylene glycol and the bisphenol is bis(4-hydroxyphenyl)-2,2-propane.

References Cited
UNITED STATES PATENTS

| | | | |
|---|---|---|---|
| 2,950,266 | 8/1960 | Goldblum | 260—47 |
| 2,973,339 | 2/1961 | Muenster | 260—47 |
| 2,989,501 | 6/1961 | Stamatoff | 260—47 |
| 3,161,615 | 12/1964 | Goldberg | 260—47 |

FOREIGN PATENTS

| | | |
|---|---|---|
| 897,640 | 5/1962 | Great Britain. |
| 1,198,715 | 5/1959 | France. |

WILLIAM H. SHORT, Primary Examiner

LOUISE P. QUAST, Assistant Examiner

U.S. Cl. X.R.

260—33.8, 49, 61, 75